(12) United States Patent
Megerdichian

(10) Patent No.: US 11,736,940 B2
(45) Date of Patent: Aug. 22, 2023

(54) L8P8 SECURE TRANSMISSION SYSTEM AND METHOD

(71) Applicant: HyeRiseInv LLC, Glendale, CA (US)

(72) Inventor: Zarik Megerdichian, Glendale, CA (US)

( * ) Notice: Subject to any disclaimer, the term of this patent is extended or adjusted under 35 U.S.C. 154(b) by 119 days.

(21) Appl. No.: 17/385,062

(22) Filed: Jul. 26, 2021

(65) Prior Publication Data

US 2022/0030427 A1     Jan. 27, 2022

Related U.S. Application Data

(60) Provisional application No. 63/057,017, filed on Jul. 27, 2020.

(51) Int. Cl.
*H04W 12/06* (2021.01)
*G06F 21/45* (2013.01)
*H04W 12/63* (2021.01)
*H04L 9/40* (2022.01)
*G06F 21/34* (2013.01)

(52) U.S. Cl.
CPC ............ *H04W 12/06* (2013.01); *G06F 21/34* (2013.01); *G06F 21/45* (2013.01); *H04L 63/126* (2013.01); *H04W 12/63* (2021.01)

(58) Field of Classification Search
CPC ....... H04W 12/06; H04W 12/63; G06F 21/34; G06F 21/45; H04L 63/126
See application file for complete search history.

(56) References Cited

U.S. PATENT DOCUMENTS

| | | | |
|---|---|---|---|
| 2016/0195602 A1* | 7/2016 | Meadow | G06F 21/6218 701/517 |
| 2016/0381510 A1* | 12/2016 | Reynolds | H04B 17/27 455/456.1 |
| 2020/0184470 A1* | 6/2020 | Singh | H04L 9/3236 |
| 2020/0294117 A1* | 9/2020 | Gao | G06F 16/9554 |
| 2021/0099372 A1* | 4/2021 | Toksoz | G06Q 30/02 |
| 2021/0328807 A1* | 10/2021 | Bansal | H04L 9/3273 |

* cited by examiner

*Primary Examiner* — Techane Gergiso

(57) ABSTRACT

A method and system of establishing trust between computing devices is described. The method includes downloading additional computer-readable instructions from a server computing device; receiving a name input value, an address input value and an email address from a user of the mobile computing device; receiving a verification message from the server computing device; communicating a confirmation verification message to the server computing device; receiving a code from the server computing device; communicating the received code to the mobile computing device for secondary verification; capturing global positioning system (GPS) measurements and/or parameters from the GPS receiver and/or communicate the captured GPS measurements and/or parameters to the server computing device; and capturing geolocation measurements and/or parameters from one or more wireless cellular towers and communicate the geolocation measurements and/or parameters to the server computing device.

7 Claims, 5 Drawing Sheets

L8P8 SECURE TRANSMISSION SYSTEM AND METHOD

RELATED APPLICATION(S)

This application is related to and claims priority to U.S. provisional patent application Ser. No. 63/057,017, filed Jul. 27, 2020, entitled "L8P8 Secure Transmission System and Method," the entire disclosure of which is hereby incorporated by reference.

BACKGROUND

In many cases, individuals have to utilize password or identify verification in order to login to applications or into their workplace when working from home. This can be problematic and time-consuming.

DETAILED DESCRIPTION

Figure 1:
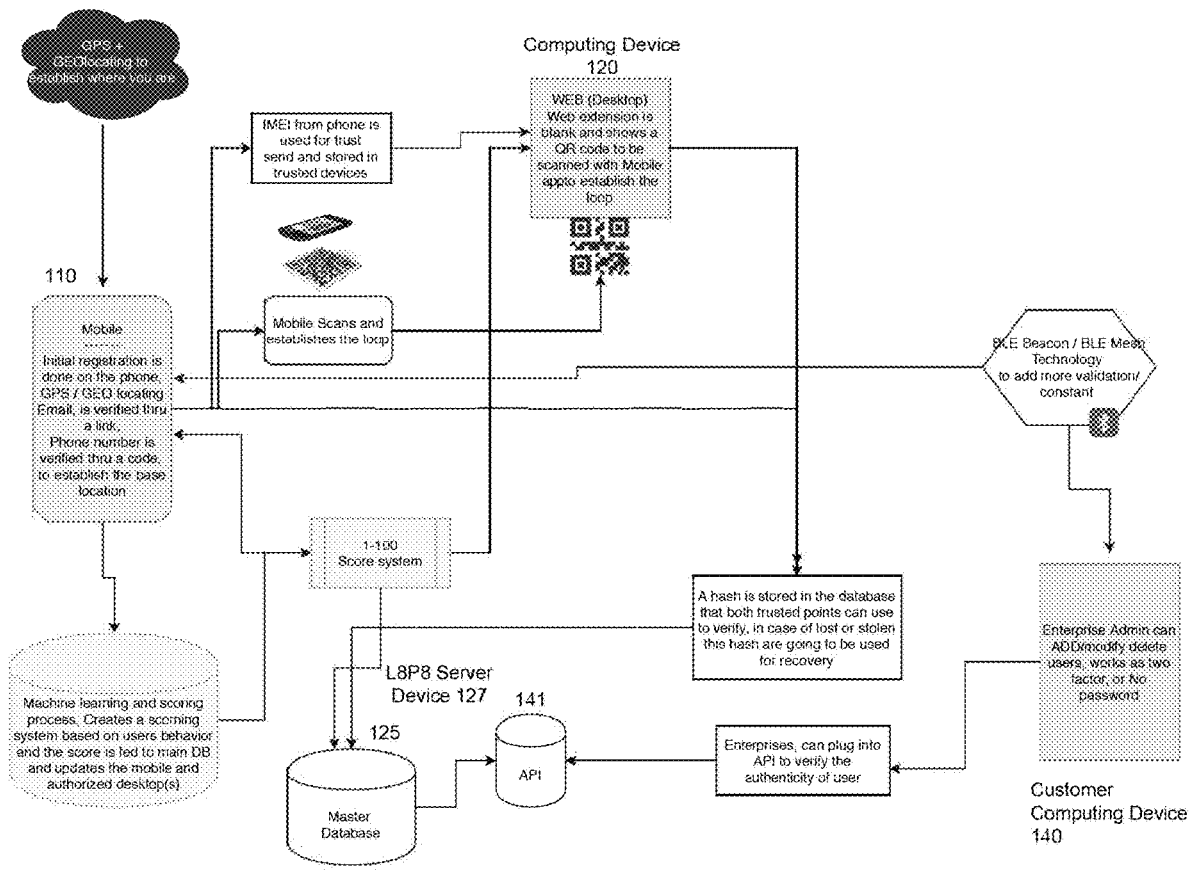
FIG. 1 illustrates a system for implementing KYC protocols to establish a digital identifier according to some embodiments.

The following detailed description and provides a better understanding of the features and advantages of the claimed subject matter described in the present disclosure in accordance with the embodiments disclosed herein. Although the detailed description includes many specific embodiments, these are provided by way of example only and should not be construed as limiting the scope of the claimed subject matter disclosed herein.

In the following detailed description, exemplary embodiments in which various aspects of the disclosure may be practiced are described in sufficient detail to enable those skilled in the art to practice the claimed subject matter. It is to be understood that other embodiments may be utilized and that logical, programmatic, mechanical, electrical and other changes may be made without departing from the spirit or scope of the present disclosure. The following detailed description is, therefore, not to be taken in a limiting sense, and the scope of the present disclosure is defined by the claims and equivalents thereof.

The description of the illustrative embodiments can be read in conjunction with the accompanying figures. Embodiments incorporating teachings of the present disclosure are shown and described with respect to the figures presented herein. The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices (processors) and/or structures and can involve use of a combination of hardware, firmware, as well as several software-level constructs (e.g., program code and/or computer-readable instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general claimed subject matter.

In some embodiments, a network may also include for example, past, present and/or future mass storage, such as, network storage devices, server farms, cloud storage, cloud server farms, and/or other forms of computing and/or device readable media, for example. A network may also include a portion of the Internet (or global communications network), one or more local area networks (LANs), one or more wide area networks (WANs), wire-line type connections, one or more personal area networks (PANs), wireless type connections, one or more mesh communication networks, one or more cellular communication networks, one or more peer-to-peer wireless communication networks, other connections, or any combination thereof. In some embodiments, a network may comprise two or more computing devices so that signal communications, such as in the form of signal packets, for example, may be exchanged, such as between a server computing device and a client computing device and/or other types of devices, including between wireless devices coupled via a wireless network, for example. In some embodiments, the wireless devices may be wireless communication devices such as smart phones, cellular phones, etc.

As described herein, computer-readable instructions executable by one or more processors on one or more computing devices (which may be referred to as the l8p8 software or l8p8 software application) may utilize or establish Know Your Customer (KYC) protocols to establish a Global Digital Identity (GDI), global digital identifier or digital identifier. For example, one computing device or laptop computing device and/or a mobile computing device may each include software (or portions of the software) that may execute and/or complete a process to provide protection for users that may be utilized instead or passwords and/or multiple verifications. An advantage of this system is that all customer personal information (besides a global identifier) resides on a user's mobile computing device and not on other servers or other third party computing devices.

In some implementations, the establishment of the GDI or digital identifier for the user and/or mobile computing device may eliminate a need for password and/or identity verification after a user has registered their mobile computing device. In some implementations, the system and/or method described herein may accomplish this by creating one or more trust loops that are based on KYC protocols, GDI and/or digital identifiers. In these implementations, the one or more created and/or established trust loops may allow computer programs, computer systems and/or computer databases to verify that users are "who the user says they are" without requiring passwords and/or codes to be remembered and/or then entered into a mobile computing device and/or phone.

In some implementations, a GDI or digital identifier may be associated with and/or identify an individual, a computing device associated with the user, a mobile computing device associated with the user, a server computing device, an Internet-of-Things (IOT) device, an organism associated with and/or affiliated with a computing device, and/or an autonomous or self-driving car (and/or any other device including a processor and/or controller and/or associated software) that needs to be verified and/or authenticated in order to access and/or login to another computing device. The teachings and methods described herein apply to all of the above-identified computing devices. In some implementations, computer-readable instructions executable by one or more processors (e.g., a software application) may assign a GDI or digital identifier to any person, living organism and/or device that may connect to a global communications network (e.g., the Internet), a local area network, a wide area network and/or a personal area network (PAN). In some implementations, the GDI or digital identifier may be thought of as being similar or as unique as a United States social security number, but having many additional and/or novel features.

In some implementations, a GDI or digital identifier may have 19 numeric and/or alphanumeric and/or symbol characters, although less or more alphanumerical and/or symbol characters may be utilized. As illustrative examples, while 19 characters is utilized, other smaller numbers of characters may be utilized (greater than 9 characters) as well as larger number of characters may also be utilized (20 characters or greater). In some implementations, if the GDI or digital identifier is 19 characters, a set number of the characters may be static and therefore not changing. In some implementations, the set number of characters may be 13; however, in other implementations, other set number of characters may be utilized. In some implementations, a remaining number of characters of the GDI may be a random number. In some implementations, the random number of characters may be 6 characters, such as when the static number of characters is 13. In some embodiments, the random number of characters may be generated at preset times, at intervals determined by a user, organism or device, or when a software application may determine that a change in the random portion of the GDI or digital identifier is necessary and/or recommended. The use of the random numbers allows additional protection from hackers and/or unauthorized third-parties from guessing and/or stealing the GDI or digital identifier. In some implementations, a portion or part of the GDI or digital identifier may be generated and/or created at registration and may be the static part of the GDI or digital identifier. In some implementations, registration may occur on a mobile computing device of a user. In this implementation, for example, the remaining or random digits of the GDI or digital identifier generated at registration will be all one number or character (e.g., six zeros or six ampersands) (because these random digits or characters may be replaced). In this implementation, another computing device (a laptop or desktop computing device) may then generate the remaining or random digits in order to have the final GDI or digital identifier created. In this implementation, the remaining or random digits may then replace the random digits generated at registration.

In some implementations, a security score or one or more security values may be generated and/or created and then associated with the GDI or digital identifier to be utilized in verifying that the person, individual, device, software program, and/or organism is the original person, individual, device and/or organism. In some embodiments, as will be discussed below, through machine learning models and/or other artificial intelligence models, a security score or one or more security values between 0 to 100 may be generated for a GDI or digital identifier, where a higher score means there is more certainty that the person, individual, mobile computing device, device, software program and/or organism, utilizing the device and/or application is the original person, individual, device and/or organism.

GDI or digital identifiers, can ultimately be added to hardware and software devices to protect the identity of trusted device. As an example, GDI or digital identifiers may be embedded in computer software applications as well to make sure the there are no two copies of the same software.

Figure 4:
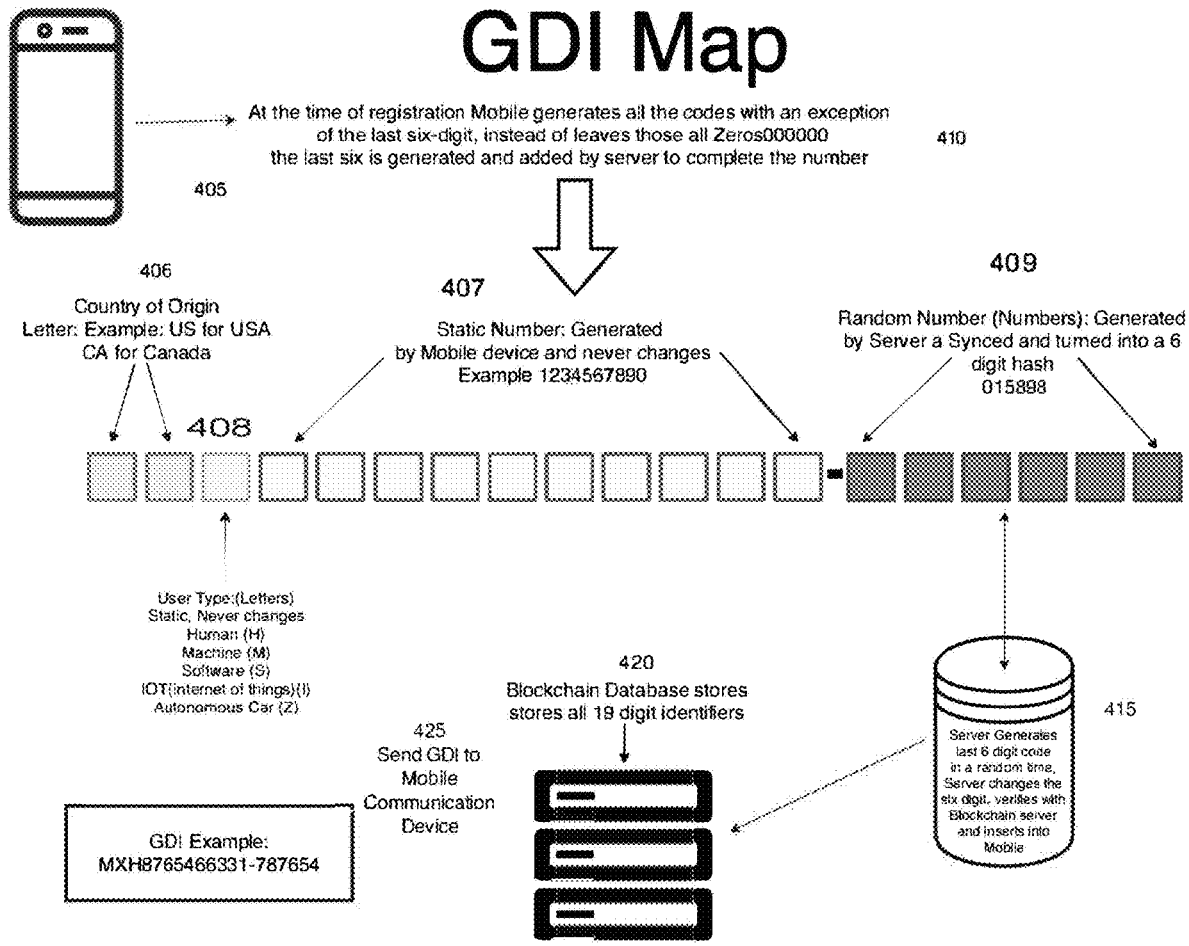
FIG. 4 illustrates a process for creating or generating a global digital identifier according to some embodiments.

FIG. 4 illustrates a process for creating or generating a global digital identifier according to some implementations. In some implementations, a mobile computing device may download a L8p8 software application 405 and/or a user may register with the l8p8 software application to utilize the L8p8 software application to provide enhanced security for the user and/or companies in using software applications. In some implementations, in step 410, a mobile communication device may generate a partial GDI or digital identifier including all of the static characters 407 and/or placeholder characters for the partial GDI or digital identifier (as is illustrated in FIG. 4). In FIG. 4, for example, the mobile communication device may generate all the characters or codes for the 13 digits and then leaves the last six characters as all zeroes. As is illustrated in FIG. 4, the country of origin values 406 may never change, the user type value 408 may never change and the static number values 407 may never change after generation. In some implementations, the mobile communication or computing device may communicate this generated GDI or digital identifier to a server computing device (e.g., which may be a L8p8 server computing device). In some implementations, the server computing device may receive the generate partial GDI or partial digital identifier and may generate and/or create 415 the last six characters or digits, as random characters. In some implementations, the random characters of the GDI or digital identifier may be hashed to create the remaining characters (e.g., the last six characters of the GDI or digital identifier). In some implementations, the remaining characters of the GDI or digital identifier are then merged with the partial GDI or partial digital identifier to create a final GDI or digital identifier. In this implementation, the random characters generated by the server computing device replace the characters generated by the mobile computing device (e.g., six characters in FIG. 4 represented by reference number 409). In some implementations, the server computing device may communicate 420 the final GDI or final digital identifier to a blockchain database (which may be the master database of the L8p8 system). In some implementations, the blockchain database may store portions of the final GDI or digital identifier in different locations and/or different servers or computing devices to provide additional security for the final GDI or final digital identifier. In some implementations, the blockchain database (or master database) (or the l8p8 computer device or server device) may communicate 430 the final GDI original to the original device, organism (and associated organism device), and/or person (through the mobile computing device) that registered for the L8p8 software. Then, the mobile communication device of the associated user, person, or organism has the final GDI or final digital identifier which can be compared to the master database and/or blockchain database to verify the original device, organism, and/or person (and associated devices) are who they say they are.

FIG. 4 also illustrates a format for the final GDI or digital identifier (e.g., the final digital identifier) according to some implementations. In some embodiments, in a 19 character or digit GDI or digital identifier, the first two characters or digits may correspond to a country code 406 and a third character may identify or correspond to a user type 408 (e.g., human (H), machine (M), software (S), IOT device (I), Autonomous or Self-Driving Car (Z). In some embodiments, the left over 10 digits of the static final GDI or digital identifier 407 may be static characters that are never changed and which are assigned and/or associated to the device, user, and/or organism after generation by the software application. In some implementations, the remaining or random characters 409 of the final GDI or digital identifier may be generated by the server computing device and may be 6 digits or characters.

Figure 2:
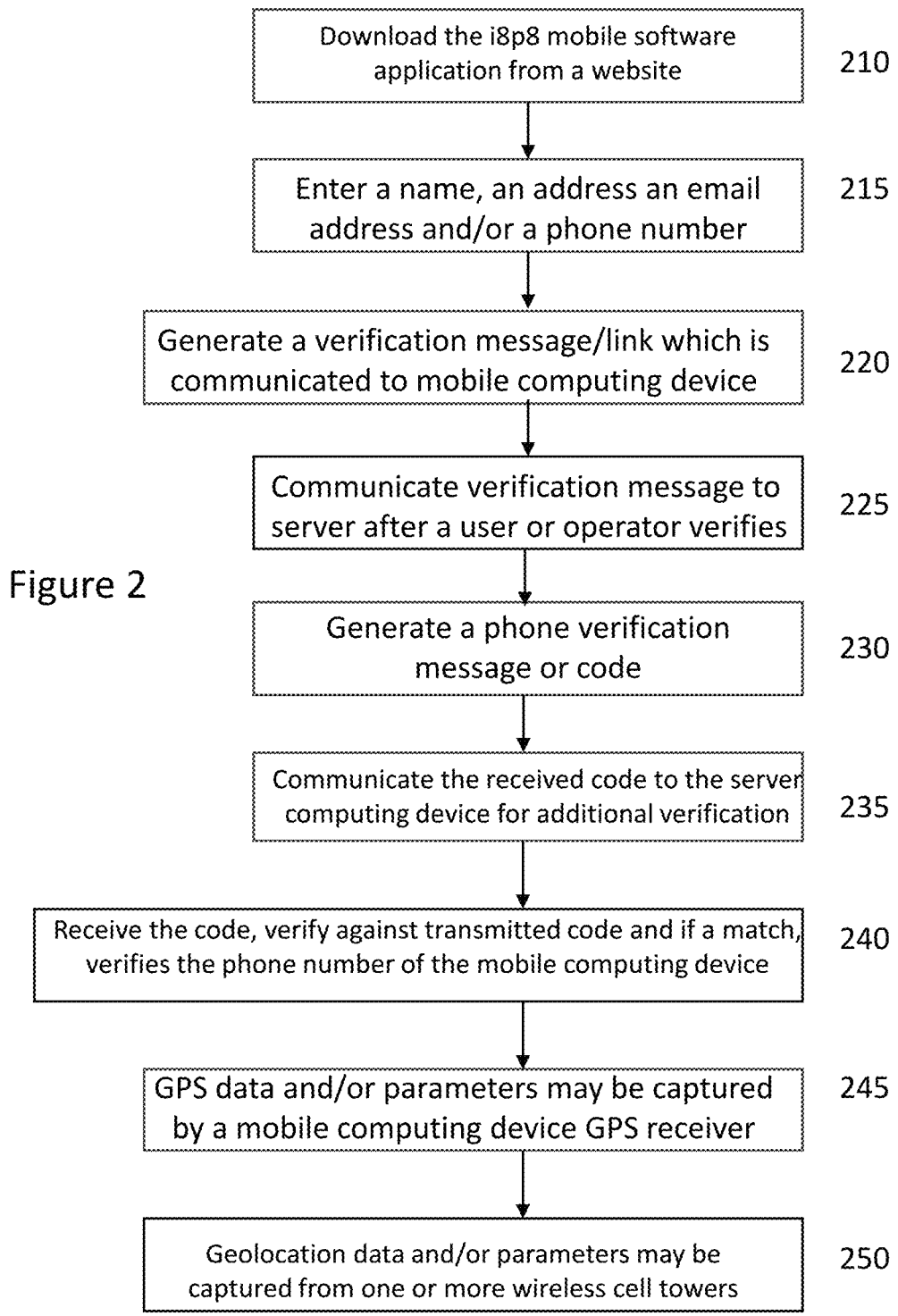
FIG. 2 illustrates a method or process for implementing KYC protocols to establish a global digital identifier or global digital identifier (GDI) according to some embodiments.
Figure 2:
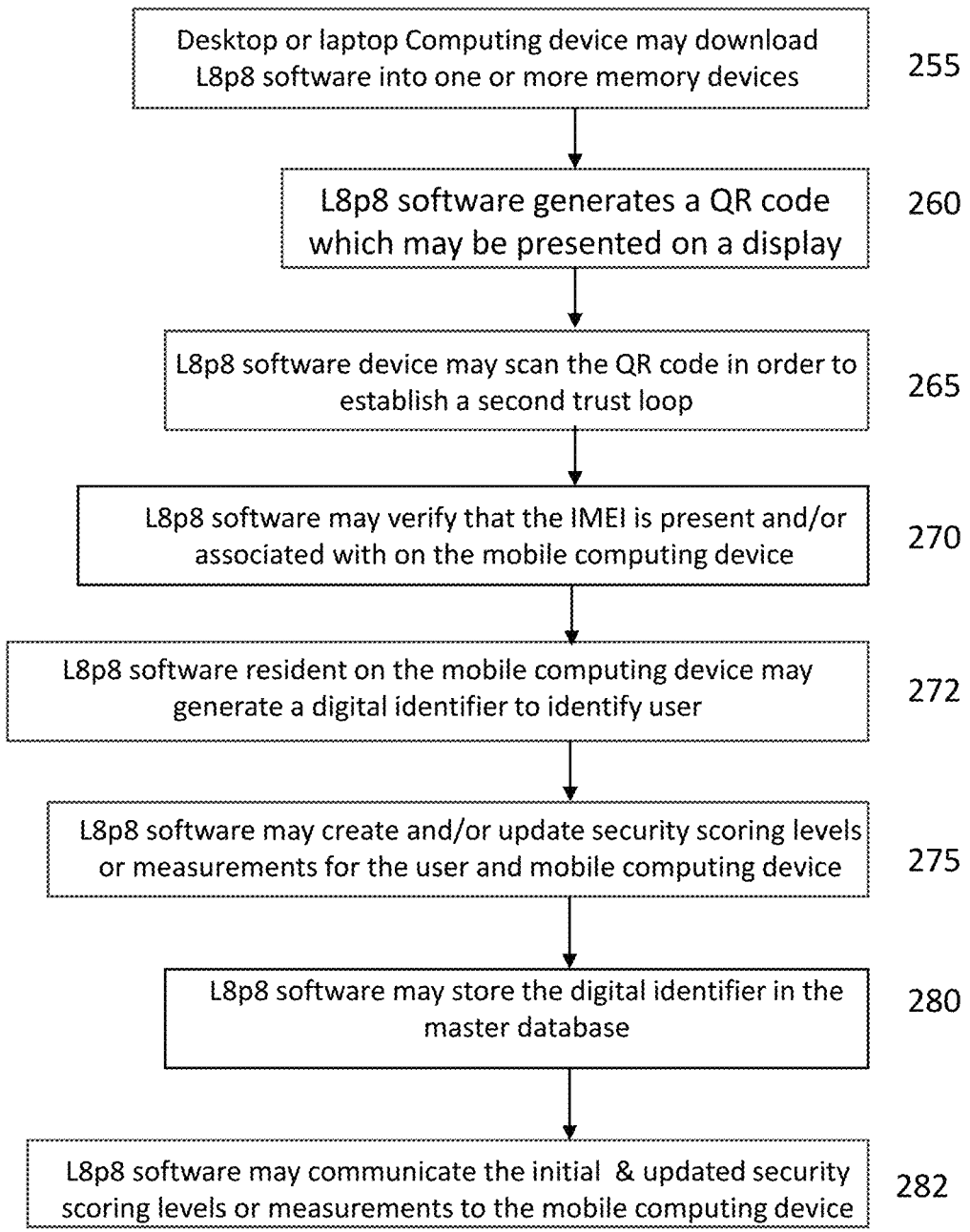

FIG. 1 illustrates a system for implementing KYC or trusted protocols to establish and/or utilized a digital identity or identifier according to some implementations. FIG. 2 illustrates a method or process for implementing KYC or trusted protocols to establish and/or utilized a global digital identity or global digital identifier (GDI) or digital identifier according to some implementations. The system for implementing trusted protocols and/or digital identifiers may include a mobile computing device 110, a laptop or desktop computing device 120, an l8p8 computing device 127 (server computing device), and/or a master database 125 (which may be a blockchain database). In some implementations, different portions of the L8p8 software may be installed on the mobile communications device 110, the laptop or desktop computing device 120 and/or the l8p8 server computing device 127.

In some implementations, the l8p8 software may be installed and/or registered for a specific user who may utilize a mobile computing device 110 to register. In step 210, a user on a mobile communications device 110 may download the L8p8 mobile software application from a website or from an application download service (e.g., such as the Apple App Store and/or the Google Play Store). In some implementations, the L8p8 mobile software application may be downloaded into one or more memory devices of the mobile computing device 110 and may be executable by the one or more processors of the mobile computing device to initiate a registration process. Mobile communications device and mobile computing device may be utilized interchangeably throughout this description and/or specification. Examples of mobile computing devices may include smart phones, mobile phones, tablet computing devices and/or wearable computing devices.

In step 215, the user (on the associated mobile computing device) may enter a name value, an address value (e.g., city and zip code are most important), an email address and/or a phone number. In some implementations, this registration information and/or parameters may be communicated and/or stored on a server computing device 127 (which may be referred to as the L8p8 server computing device). In some implementation, the registration information and/or parameters may be stored in a master database 125. In step 220, in some implementations, computer-readable instructions stored on one or more server computing devices 127 may be executable by the one or more processors to generate a verification message and/or link which is then transmitted or communicated to the mobile computing device 110. In some embodiments, in step 225, a response verification message or command may be communicated after a user or operator has determined through the L8p8 mobile application software that the email has been verified. In some implementations, the mobile computing device 110 may communicate the response verification message to the L8p8 server computing device 127.

In some implementations, in step 230, the computer-readable instructions may be executable by the one or more processors of the server computing device 127 to generate a phone verification message or code and to communicate the phone verification message or code to the mobile computing device 110. In some embodiments, in step 235, the mobile computing device 110 may receive a code from a user or operator and may communicate the received code to the server computing device 127 for additional verification of the user or operator. This may be referred to as a second response verification message. In some implementations, in step 240, the computer-readable instructions on the server computing device 127 may receive the code (or second response verification message), verify this against the code that the server computing device 127 transmitted and if there is a match, may verify the phone number of the mobile computing device. This results in a double verification process and/or also establishment of a first trust loop between the mobile computing device 110 and the server computing device 127.

In some implementations, in step 245, global positioning system data, measurements and/or parameters may be captured by a mobile computing device GPS receiver. In some embodiments, the GPS data, measurements and/or parameters may verify where the user or operator is within a city or geographical location (along with the location of the mobile computing device 110). In some implementations, the mobile computing device may communicate the captured global positioning system data, measurements and/or parameters to the server computing device 127 and/or this GPS data, measurements and/or parameters may be stored in the master database 125.

In some implementations, in step 250, geolocation data and/or parameters may be captured from one or more wireless cell towers utilizing the one or more wireless communication transceivers of the mobile computing device 110. In some implementations, computer-readable instructions executable by the one or more processors (or L8p8 software) may analyze the captured geolocation data, measurements and/or parameters to determine if the mobile computing device is in the area corresponding to and/or located nearby the input address value. In some implementations, the mobile computing device 110 may communicate the captured geolocation data, measurements and/or parameters to the server computing device 127, which may store the received geolocation data, measurements and/or parameters in the master database 125.

In some implementations, after registration the l8p8 computing device 127 may communicate a link or hyperlink to an email address provided by the user through the mobile computing device 110. In some implementations, the link or hyperlink may be to a computing device (e.g., it could be a third-party store or the l8p8 computing device 127) which has browser extension files that may be downloaded for the l8p8 software application. In step 255, a desktop computing device or laptop computing device may download L8p8 software (a l8p8 extension for a browser) (e.g., computer-readable instructions executable by one or more processors of the desktop or laptop computing device) into its one or more memory devices. In some embodiments, a L8p8 web extension may be downloaded for a browser being utilized by the user or operator. In some implementations, there may be different L8p8 web extensions for different browsers (e.g., Google Chrome, Firefox, Microsoft Explorer). In some embodiments, the mobile computing devices may be a tablet computing device (e.g., such as iPad, Microsoft Surface, and/or Android Galaxy). In some embodiments, as discussed above, the mobile computing device may be associated with, affiliated with and/or assigned to organisms, autonomous driving devices or cards, and/or iOT devices that are connectable to the Internet and/or the global communications network (as well as local area networks, personal area networks and/or wide area networks). In some implementations the desktop or laptop computing device 120 may be a computing device where the user logs into the most. The computing device 120 must be different from the mobile computing device.

In some implementations, in step 260, the L8p8 software browser downloaded by the desktop or laptop computing device may generate a QR code (or other scannable code) which may be presented on a display on the monitor or screen of the desktop or laptop computing device 120. In some implementations, the QR code (or other scannable code) may includes its own unique identifier (different than the global identifier) which includes letters and/or numbers (characters) representing a device type and/or browser type as well as other information about the desktop or laptop computing device 120.

In some implementations, in step 265, the L8p8 software on the mobile computing device 120 and/or an imaging device of the mobile computing device 120 may scan the QR code (or other scannable code) on a display or monitor of second computing device 120 (e.g., the desktop or laptop computing device) in order to establish a second trust loop for the L8p8 software. Thus, the mobile computing device 110 and/or 120 are now connected to each other as trusted devices. This means that a second computing device has verified that the mobile computing device and/or user 110 are who they say they are. Now when a desktop computing device logs into a website, the mobile computing device 110 will assist the desktop computing device 120 in logging in. This allows the desktop computing device 120 to not have to store passwords. This occurs because the user's usernames and passwords will be generated by the l8p8 software and stored only on the mobile computing device 110 (not the laptop or desktop computing device 120). Thus, the passwords of the user will not be on the desktop or laptop computing device 120 and cannot be accessed by hackers. This further increases security for the mobile computing device 110 and/or other computing devices that the mobile computing device 110 and/or user (organism, autonomous driving devices or cars, iOT devices) is interacting with and/or interfacing with (such as many third-party software applications).

In some implementations, in step 270, the L8p8 software resident on the desktop or laptop computing device 120 may communicate with the mobile computing device utilizing Bluetooth wireless communications protocol. In some embodiments, the L8p8 software may verify that the International Mobile Equipment Identity (IMEI) is present and/or associated with on the mobile computing device 110.

In some implementations, in step 272, the L8p8 software resident on the mobile computing device 110 may generate a global digital identifier (GDI) or digital identifier to identify the user and mobile computing device (or organism, autonomous driving devices or cars, iOT devices) after the second trust loop has been created. In some implementations, the digital identifier may be based at least in part on the trusted loops that have been created and/or generated and/or the verifications of the email and/or the phone number from the mobile computing device 110. In some implementations, the global digital identifier (GDI) or digital identifier as a whole may be randomly generated, or alternatively, a portion of the GDI or digital identifier may be static and a portion of the GDI or digital identifier may be randomly generated (as was discussed previously with respect to FIG. 4). In some implementations, a third party may not be able to decipher the user's email, phone or geographic location and/or the mobile computing device's IMEI number from the digital identifier. In some implementations, the L8p8 software on the mobile computing device 110 may communicate the digital identifier to the L8p8 server computing device 127 to be stored in the master database 125. In some implementations, the l8p8 server computing device 127 may store the digital identifier in the master database 125. In some implementations, as discussed above with respect to FIG. 4, the l8p8 computing device 127 may generate one or more random numbers or characters which may be inserted into or replaced certain numbers or characters of the GDI or digital identifier received from the mobile computing device. In some implementations, the revised or final GDI or digital identifier may then be stored in the master database 125. In some implementations, the mobile computing device 110 may generate a hash based at least in part on (or derived from) the GDI or the digital identifier (or updated GDI or digital identifier). In some implementations, the mobile computing device 110 may communicate the hash value based on the digital identifier to the master database 125 utilizing the l8p8 computing device. In some implementations, the L8p8 software on the l8p8 computing device 127 may generate a hash value utilizing (or that is based on) the GDI or digital identifier that can be used for verification in case the GDI or digital identifier is hacked, stolen and/or lost, and then the hash value may be utilized for recovery of the GDI or digital identifier.

In some implementations, in step 275, after registration, the L8p8 software may create and/or update security scoring levels, values or measurements for the user and mobile computing device (or organism, autonomous driving devices or cars, iOT devices). In some implementations, the L8p8 software on the server computing device 127 may create an initial security score level, value or measurement for the user or mobile computing device 110 based, at least in part, on the GPS measurements and/or values, and/or geographic location that was previously captured from the mobile computing device 110. In some embodiments, the L8p8 software may alternatively, or in addition to utilize captured geolocation measurements and/or values and/or geographic locations from the mobile computing device 110, which may also be utilized to create and/or update the initial security score level, value or measurement based on these geolocation measurements. In some embodiments, geolocation may utilize a triangulation process from three or more local cellular transmitters to pinpoint an estimated location. These measurements are important because these GPS, location, geolocation measurements and/or values may identify if the mobile computing device or user 110 (or organism, autonomous driving devices or cars, iOT devices) is in an area that is trusted and/or utilized by the user. They assist in determining whether another mobile computing device (which may have login credentials) is trying to spoof or trick another computing device into allowing the another computing device to allow the another mobile computing device to access its system.

In some implementations, a user, an administrator and/or the L8p8 software may define access levels or values for different programs or application programs that are based on security scoring levels, values or measurements. These software programs or application programs may be entity software applications, third party software applications or other software applications that have implemented and/or are utilizing the digital identifier or GDI as a means of access. In some implementations, the third party software applications, entity software applications or other software applications may not be aware the user is utilizing the digital identifier, although this may result in lower security. In other words, the user, administrator, and/or L8p8 software may identify or establish that high security score levels or values may be necessary or required to access higher level security software applications or computer systems at these specific locations (e.g., like accessing banking and/or investment information; governmental information and/or medical information). However, other software applications may not need high security scoring levels, values or measurements in order to be accessed (e.g., streaming services). The scoring level or scoring value threshold for access may be established from the other computer application program or computer systems along with administrators or managers of the l8p8 server computing device. In other words, a user or operator and/or the associated mobile computing device may have a low security scoring level or value (e.g., because they have spent a fair amount of time or are spending a fair amount of time in what has been defined to be a less secure area (away from the area where they registered themselves and their mobile computing device)), and thus may only be able to access entertainment software applications and/or streaming software applications (e.g., such as Netflix), which require or request lower security levels or values. As an example of how security scoring levels or measurements may be calculated is as follows. There may be home locations or your own locations (and/or trusted locations) where high points are awarded if the GPS measurements identify that the user and associated mobile device are in those locations because they match the input address and/or city values. In some implementations, for example, if the GPS measurements, identify that you are in Glendale (which is your home city where you registered the application, a security scoring level or measurement may be increased by one point). In some implementations, if the GPS measurements or values identify that the user and/or associated mobile computing device is in city near to Glendale, the security scoring level or measurement may be increased by 0.5 points and/or 0.25 points depending on how close and/or how trusted the location is to the home location or the initial location. In some implementations, if the GPS measurements or values identify that the user and/or associated mobile computing device is in Miami, the L8p8 software may generate a security score level, value or measurement having a negative value (e.g., the security score level or measurement may decrease by 0.5 points). Similarly, if the GPS measurements or values identify that the user and/or associated mobile computing device is in London, then the L8p8 software may generate a security score level or measurement having a higher negative value of 1.0 points). In other words, if the user and/or associated mobile computing device is in a remote and/or less trusted location, the L8p8 software may not allow the user to access sensitive and/or high-level security software applications. These examples also apply to utilizing geolocation parameters, measurements and/or value in place of, or in addition to GPS measurements and/or values. In some implementations, the level of protection (e.g., threshold security level values or scores that need to be achieved—e.g., a security level value) may be defined by the user or the system administrator. For example, a user may determine and/or set a preference for a level of protection they desire to allow access to their accounts in certain computing device systems and/or software applications. In some embodiments, a machine learning algorithm (or other Artificial Intelligence (AI) algorithm) may be utilized to generate the security scoring level or value for the different geographic location, geolocation and/or GPS measurements and/or values.

In some implementations, in step 280, the L8p8 software may store the security scoring levels, values or measurements (e.g., the initial scoring levels, value or measurements) in the master database 125 of the L8p8 server computing device 127. In some implementations, the mobile computing device 110 may capture and/or communicate updated geolocation, location, and/or GPS parameters, measurements or values to the server computing device 127 to update a location of the mobile computing device. In these implementations, the software on the l8p8 computing device 127 may calculate updated security scoring levels, values and/or measurements in the l8p8 computing device. In some implementations, security scoring levels or measurements in the master database 125 may be associated with and/or affiliated with the digital identifier stored in the master database 125 for the user and/or associated mobile computing device 110 or organism, autonomous driving devices or cars, iOT devices.

In some implementations, in step 282, the L8p8 software may communicate and/or transmit the initial and/or updated security scoring levels or measurements to the mobile computing device 110. In some implementations, the scoring levels or values may not be stored in the master database 125 or the l8p8 computing device 127.

As discussed above, after initial registration with the L8p8 software by the mobile computing device and the creation or establishment of one or more trust loops by 1) communicating with a l8p8 server computing device and/or 2) the l8p8 website utilizing a desktop or laptop computing device engaging, the digital identifier or digital ID code or GDI may be stored in the master database 125. In these embodiments, a goal and/or objective of this system (e.g., the L8p8 software application on the various computing devices) is to not store any personally identifiable information (PII), on any public server (e.g., including the L8p8 server computing device). In some implementations, the L8p8 server computing device may only store the user or operator's digital identifier in the master database 125. In some implementations, the server computing device 127 and/or the master database 125 may also encrypt the digital identifier before it is stored. In some implementations, the L8p8 software may require changing of the digital identifier on a periodic basis and the L8p8 software on the mobile computing device 110 and/or the desktop or laptop computing device 120 may create the new or modified digital identifier based on the processes or methods described herein. In some embodiments, by changing or modifying the digital identifier, hackers may be prevented (or it may be made extremely difficult for hackers) to be able to decrypt your digital identifier.

Figure 3:
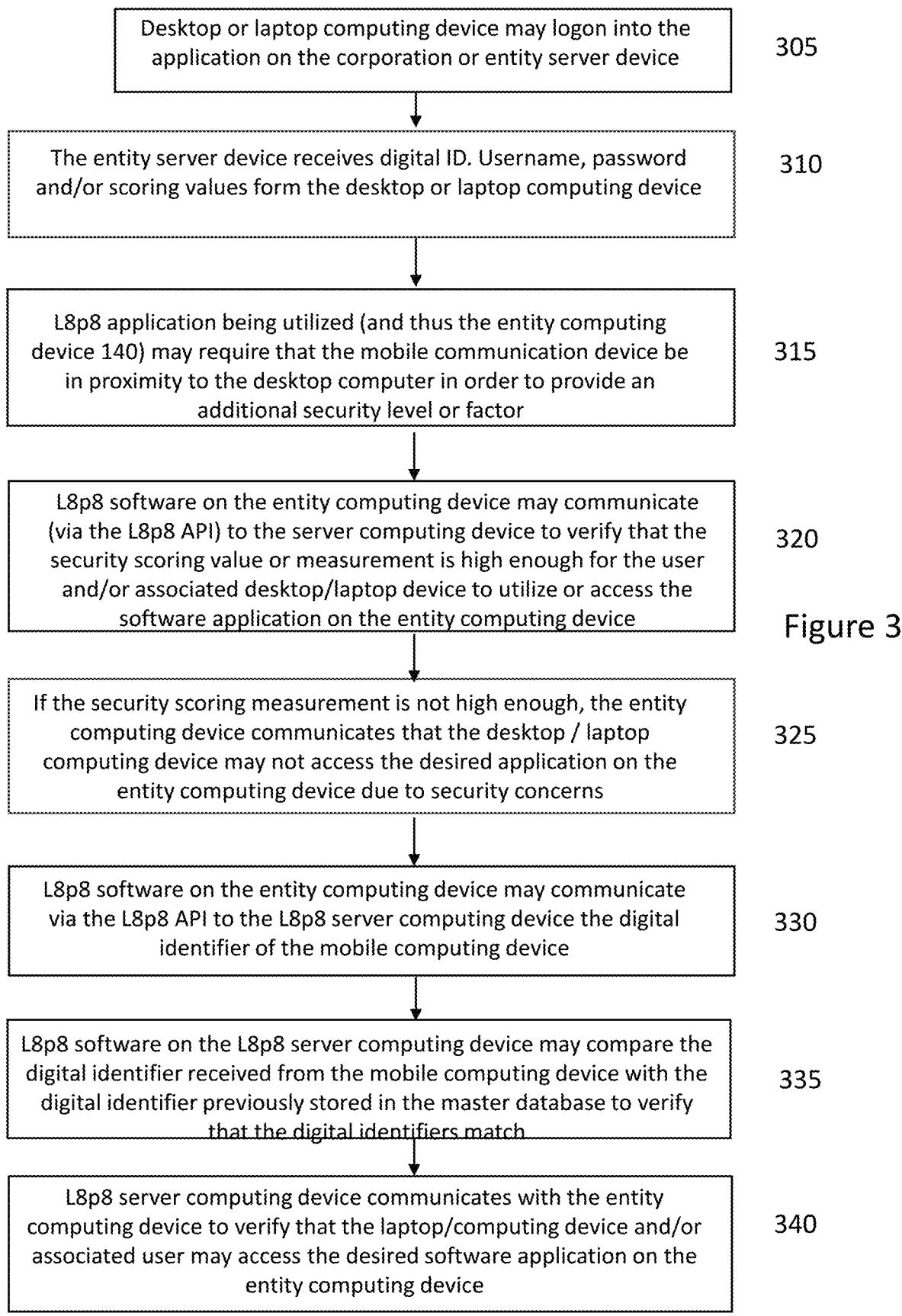
FIG. 3 illustrates a method or process for implementing L8p8 software in a commercial, corporate and/or enterprise application according to some embodiments.

Utilizing L8p8 software in commercial, corporate or enterprise software applications. FIG. 3 illustrates a method or process for implementing L8p8 software in a commercial, corporate and/or enterprise application according to some embodiments. In some implementations, corporations or other entities may have their applications utilizing the authentication or verification of the L8p8 software. This software may be utilized by users who are logging into corporate or entity computing devices from laptop or desktop computing devices 120. In some implementations, the mobile computing device 110 and the desktop computing device 120 may be in close proximity in order for the mobile computing device 110 to automatically provide the laptop or desktop computing device 120 with necessary login or access credentials without the user or desktop computing device having to input the credentials (e.g., the username and/or password). As an example, if a user utilizes a desktop or laptop computing device 120 with the l8p8 extension browser software installed may login to the entity or corporate computing device 140 to try and access the software. Because the desktop or laptop computing device 120 has a browser with the l8p8 or trust extension browser software installed, the desktop or laptop computing device 120 may communicate with the mobile computing device 110 and the l8p8 or trust software installed thereon may generate a username and/or password (which may be randomly generated and/or quite complex) for the desktop or laptop computing device 120 to access the corporate or entity server 140. This may occur a first time the user accesses the application on the entity computing device 140. In some implementations, the mobile computing device 110 may communicate the generated username, password, scoring levels or values, and/or digital identifier the desktop or laptop computing device 120 to communicate to the corporation or entity server computing device 140. In these implementations, the generated username, password, scoring levels or values and/or digital identifier may not be stored by the desktop or laptop computing device and instead may be stored in the one or more memory devices of the mobile computing device. In addition, the web address for the corporate or entity server computing device that was just accessed may also be stored in one or more memory devices of the mobile computing device 110 along with the generated username, password, scoring levels or values and/or digital identifier in order to link all of this information or data in the future. This allows easier interaction in the future between the desktop or laptop computing device 120 and the mobile computing device 110 to retrieve the username and password, and/or then to communicate the username, password, scoring level values and/or digital identifier to the desktop or laptop computing device, which then communicates the same information to the corporate or entity server computing device 140.

In some implementations, the corporation or entity server computing device 140 and/or the associated website may include an application programming interface (API) 141 (which may be computer-readable instructions stored in the server computing device that are executable by the one or more processors) to interface with the one or more laptop or desktop computing devices 120 and/or the L8p8 server computing devices 127.

In some implementations, in step 305, a desktop or laptop computing device 110 may logon into the application on the corporation or entity server device 140 utilizing the associated website url or address. In some cases, the user or operator may login into a streaming service or a financial service. As described above, the desktop or laptop computing device 120 may include the trust or l8p8 extension in the browser that is being used to login to the corporate/entity server device 140. In this implementation, the desktop or laptop computing device 120 may communicate the website url address with the mobile computing device 110 and the mobile computing device 110 may retrieve the username, the password, the one or more scoring values or levels and/or the digital identifier from the one or more memory devices corresponding to and/or associated with the supplied url or website address. In this implementation, the mobile computing device may communicate username, the password, the one or more scoring values or levels and/or the digital identifier to the desktop or laptop computing device 120 which may in turn communicate the username, the password, the one or more scoring values or levels and/or the digital identifier for this application or website to the corporate or entity server device 140.

In some implementations, corporations or other entities may have their applications utilizing the authentication or verification of the L8p8 software. In some embodiments, the corporation or entity server computing device 140 and/or the associated website may include an application programming interface (API) 141 (which may be computer-readable instructions stored in the server computing device that are executable by the one or more processors) to interface with one or more laptop or desktop computing devices 120 and/or the L8p8 server computing devices 127.

In some cases, the user or operator may login into a streaming service (e.g., Netflix or Disney+) or an online banking or investment account (e.g., Bank of America or Fidelity). Because the entity server device 140 is utilizing L8p8 protocol and/or software along with the desktop or laptop computing device 120, the entity server device 140 does not need to go through multiple verification steps including sending a verification code to the desktop or laptop computing device 120 and/or another computing device or phone associated with the user of the laptop or desktop computing device. In step 310, the corporate or entity server 140 may receive the communicated username, the password, the one or more scoring values or levels and/or the digital identifier from the laptop or server computing device 120.

In some implementations, in step 315, the application being utilized (and thus the entity computing device 140) may also require that the mobile communication device 110 be in proximity to the desktop or laptop computing device 120 in order to provide an an additional security level or factor for access. If the mobile communication device is not in proximity to the laptop or desktop computing device 120, a message may be generated by the desktop or laptop computing device 120 that trust or l8p8 software may be utilized to automatically login to the corporate or entity computing device 140.

In some implementations, in step 320 the L8p8 software on the entity computing device 140 may communicate (via the L8p8 API 135) to the server computing device 127 to verify that the security scoring level or measurement is high enough for the user and/or associated laptop or desktop computing device 120 to utilize or access the software application on the entity computing device 140. In some implementations, the l8p8 software on the entity computing device 140 may perform the comparison or scoring levels or values locally (without going to the l8p8 computing device or server 127). In some implementations, in step 325, if the security scoring measurement or value is not high enough, the entity computing device 140 communicates to the laptop or desktop computing device 120 that the user associated with the laptop computing device 120 may not access the desired application on the entity computing device 140 due to security concerns. This verification adds an additional level of complexity to a secure process.

In some implementations, in step 330, the L8p8 software on the entity computing device 140 may communicate via the L8p8 API 135 to the L8p8 server computing device 127 the digital identifier of the mobile computing device (which was supplied by the desktop or laptop computing device).

In some implementations, in step 335, the L8p8 software on the L8p8 server computing device may compare the digital identifier received from the laptop or desktop computing device 120 with the digital identifier previously stored in the master database 125 to verify that the digital identifiers match. In some implementations, in step 340, the L8p8 server computing device 127 may communicates with the entity computing device 140 to verify that the laptop or desktop computing 120 and/or associated user may access the desired software application on the entity computing device 140 because it has the mobile computing device's correct digital identifier.

As detailed above, the computing devices, servers, and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor. The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, controllers, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device or toy robotic device, may cause the computing device or toy robotic device to perform one or more tasks, such as the method step. In addition, one or more of the devices described herein may transform data, physical devices, and/or representations of physical devices from one form to another. Additionally, or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers (or computing devices or toy robotic devices), or be loaded and executed by one or more servers (or computing devices). One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server computing devices or toy robotic devices or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including," "incorporating," "includes," "incorporates," and "having" (and their derivatives), as used in the specification and claims, are interchangeable with and shall have the same meaning as the word "comprising."

The processor as disclosed herein can be configured with instructions to perform any one or more steps of any method as disclosed herein. As used herein, the term "or" is used inclusively to refer items in the alternative and in combination. As used herein, characters such as numerals refer to like elements. Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

The invention claimed is:

1. A mobile computing device, comprising:
   one or more processors;
   one or more memory devices;
   computer-readable instructions, the computer-readable instructions executable by the one or more processors to:
   download additional computer-readable instructions from a server computing device, the additional computer-readable instructions directed to establishing authentication of a user;
   receive a name input value, an address input value and an email address from a user of the mobile computing device;
   receive a verification message from the server computing device;
   communicate a confirmation verification message to the server computing device;
   receive a code from the server computing device, the code utilized to verify a phone number of the mobile computing device;
   communicate the received code to the mobile computing device for secondary verification;
   capture global positioning system (GPS) measurements, and parameters from a GPS receiver and communicate the captured GPS measurements and parameters to the server computing device;
   capture geolocation measurements and parameters from one or more wireless cellular towers and communicate the geolocation measurements and parameters to the server computing device;
   scan a code on a display of a second computing device to begin and establish a trust loop;
   generate a digital identifier value or assist in generating the digital identifier value for the user and associated mobile computing device and communicate the generated digital identifier value to the server computing device;
   generate a hash value utilizing the digital identifier value and communicate the generated hash value to the server computing device;
   receive one or more scoring values from the server computing device, the one or more scoring values based on a comparison of the address input value to the captured GPS measurements and parameters, and the captured geolocation measurements and parameters;
   receive from the second computing device a website url value for a software application that the second computing device is attempting to access;
   generate a username and password for the software application on a third computing device; and
   communicate the generated digital identifier value, the one or more scoring values, the username and the password to the second computing device to initiate access for the software application on the third computing device.

2. The mobile computing device of claim 1, the downloadable computer-readable instructions further to:
   store the username and the password for the software application on the third computing device along with the url address for the software application.

3. A computing device, comprising:
   one or more processors;
   one or more memory devices;
   computer-readable instructions, the computer-readable instructions executable by the one or more processors to:
   receive a name input value, an address input value and an email address from a mobile computing device;
   communicate a first verification message to the mobile computing device, the first verification message including a link;
   receive a first verification response message from the mobile computing device;
   communicate a second verification message to the mobile computing device, the second verification message including a numerical or alphanumerical code;
   receive a second verification response message from the mobile computing device, the second verification response including a response numerical or alphanumerical code and if the second verification response matches the second verification message, a phone number of the mobile computing device is verified;

receive captured global positioning system (GPS) measurements and parameters from a GPS receiver of the mobile computing device;

receive, from the mobile computing device, captured geolocation measurements and parameters from one or more wireless cellular towers;

compare the received GPS measurements and parameters to the received address input value to verify the mobile computing device is located within a same geographical area as the address input value;

compare the received geolocation measurements and parameters to the received address input value to verify the mobile computing device is located within a same geographical area as the address input value;

generate one or more scoring values based at least in part on the comparison of the received GPS measurements and parameters and the received geolocation measurements and parameters to the address input value;

receive a digital identifier from the mobile computing device and from a second computing device;

associate the received digital identifier with the phone number of the mobile computing device;

store the received digital identifier for the mobile computing device and user in a database;

generate updated one or more scoring values for the mobile computing device based at least in part on the comparison of the received GPS measurements and parameters and the received geolocation measurements and parameters to the address input value; and store the updated one or more scoring values for the mobile computing device in the database.

4. The computing device of claim 3, the computer-readable instructions further executable to:

communicate the updated one or more scoring values for the mobile computing device.

5. The computing device of claim 3, the computer-readable instructions further to:

receive a request from an entity computing device housing a software application, the request including one or more scoring values from a desktop or laptop computing device attempting to access the software application on the entity computing device, the one or more scoring values associated with the mobile computing device affiliated with the desktop or laptop computing device.

6. The computing device of claim 5, the computer-readable instructions further to:

compare the received one or more scoring values for the mobile computing device, received from the entity computing device, to the one or more scoring values stored in the database to verify the received one or more scoring values are equal or greater than a threshold value for the mobile computing device and communicate to the entity computing device whether or not the desktop or laptop computing device associated with the mobile computing device is verified to access the application on the entity computing device.

7. The computing device of claim 5, the computer-readable instructions further to:

compare the received digital identifier for the mobile computing device, received from the entity computing device, to the digital identifier stored in the database for the mobile computing device to verify the digital identifier received from the entity computing device and the digital identifier stored in the database match; and communicate to the entity computing device whether or not the desktop or laptop computing device is verified to access the application on the entity computing device based on whether the digital identifier received from the entity computing device and the digital identifier stored in the database match.

* * * * *